United States Patent [19]
Kazan et al.

[11] Patent Number: 4,807,282
[45] Date of Patent: Feb. 21, 1989

[54] PROGRAMMABLE P/C COMPATIBLE COMMUNICATIONS CARD

[75] Inventors: Howard Kazan, Raleigh; Ronald W. Kohake, Cary, both of N.C.

[73] Assignee: International Business Machines Corp., Armonk, N.Y.

[21] Appl. No.: 814,436

[22] Filed: Dec. 30, 1985

[51] Int. Cl.$^4$ ............................................. G06F 9/00
[52] U.S. Cl. .................................................. 379/284
[58] Field of Search ............... 364/200 MS File, 200, 364/900; 379/94, 28, 96, 284, 269, 274, 290

[56] References Cited

U.S. PATENT DOCUMENTS

4,079,452 3/1978 Larson et al. ...................... 364/200

Primary Examiner—Gareth D. Shaw
Assistant Examiner—John G. Mills
Attorney, Agent, or Firm—Joscelyn G. Cockburn

[57] ABSTRACT

A multi-protocol communications adapter (MPCA) is used to interconnect a Local Area Network (such as a store computing system) to a communications highway. The MPCA includes a plurality of protocol controllers, each one of the controllers being operable for converting a data stream into a predetermined format. A programmable configuration register is provided for selecting one of the protocol controllers. A controlled interface is provided for gating the selected controller onto the communications highway. The MPCA is packaged as a card or module. It is coupled to a primary computer that controls the Local Area Network. The primary computer may effectuate a protocol change by changing the contents of the configuration register. Thus, the MPCA can be used with a pre-existing primary computer without significantly changing the architecture and/or programming of said computer.

5 Claims, 7 Drawing Sheets

| DATA BYTES | ADDRESS RANGES | | PROTOCOLS | INTERRUPTS |
|---|---|---|---|---|
| 00 | 3A0 | 3AF | BSC | 3 & 4 |
| 01 | 380 | 38F | BSC | 3 & 4 |
| 02 | 3A0 | 3AF | SDLC | 3 & 4 |
| 03 | 380 | 38F | SDLC | 3 & 4 |
| 04 | 380 | 38F | SDLC | 3 & 4 & DMA 1 |
| 05 | 3F8 | 3FF | ASYNC | 4 |
| 06 | 2F8 | 2FF | ASYNC | 3 |
| 07 | 3A0 | 3AF | SDLC | ALL ON 3 |
| 08 | 3A0 | 3AF | SDLC | ALL ON 4 |
| 09 | 380 | 38F | SDLC | ALL ON 3 |
| 0A | 380 | 38F | SDLC | ALL ON 4 & DMA 1 |
| 0B | 3A0 | 3AF | BSC | ALL ON 3 |
| 0C | 3A0 | 3AF | BSC | ALL ON 4 |
| 0D | 380 | 38F | BSC | ALL ON 3 |
| 0E | 380 | 38F | BSC | ALL ON 4 |
| 0F | DISABLES ADDRESS DECODE FOR ALL ADDRESSES EXCEPT THE CONF REG | | | |

PROGRAMMABLE P/C COMPATIBLE COMMUNICATIONS CARD

BACKGROUND OF THE INVENTION

1. Field of the Invention

The invention relates to data communications in general and more particularly to circuit arrangements or adapters for attaching computers to a communications highway.

2. Prior Art

Digital data communication between personal computers and a remote host computer installation is coming into widespread use. A typical communications network that facilitates digital data transmission usually consists of a protocol conversion circuitry, an EIA interface circuitry, and a modem. The protocol conversion circuitry transforms the digital data into one of the well-known control protocols, namely SDLC (Synchronous Data Link Control), Asynchronous (Async), High Level Data Link Control (HLDLC), (Bisync), Advanced Data Communications Control Procedure (ADCCP), etc. The EIA interface circuitry conditions signals outputted from the protocol converter and supplies said signals to the modem from whence the signals are transmitted through telephone lines and/or equivalent narrow band communications channels.

The prior art has provided both single and multiple type protocol converters. The single type protocol converter can only transform data into one type of protocol whereas the multi-protocol converter can transform data into one of a plurality of protocols. Examples of the prior art protocol converters are set forth in U.S. Pat. Nos. 4,494,186; 4,467,445; 4,513,373; 4,504,901; 4,519,028; 4,500,933; 4,494,186. Arguably, these protocol converters work well for the intended purpose. However, a general drawback is that the circuitry of the adapters is very complicated and cannot be easily used with pre-existing microcomputers. Any attempt to use the prior art protocol converters with pre-existing computers (be it personal or otherwise) requires extensive changes in the computer's architecture and/or the computer's programming.

Because of the stated impact, it would seem as if there is a need for a multi-protocol converter that is compatible with the architecture and/or programming of pre-existing computers. Such a multi-protocol adapter can be easily mounted in the computer and provides the facility whereby the computer may communicate with a remote host, etc.

SUMMARY OF THE INVENTION

It is a general object of the present invention to provide a universal and more efficient communications adapter than was heretofore possible.

It is another object of the present invention to provide an adapter that can be used with a pre-designed and/or pre-existing computer (personal, etc.) without the need for changing the architecture and/or the programming of the computer.

These and other objects are achieved by a communications adapter which includes three protocol controllers. The inputs to the controllers are coupled through a selection control logic circuit means, and a configuration control logic circuit means, to the data and address buses of a Personal Computer (PC). The outputs from the modules are coupled through a multiplexor logic circuit arrangement to a communications highway.

The selection and configuration control logic means includes a set of address decoders and a configuration register. The configuration register is loaded by the PC and, when decoded, its outputs are used to select one of the address decoders, the particular protocol controller that will process the data and the interrupt level on which the adapter will communicate with the PC. In addition, the configuration control logic circuit means provides control signals which are used to enable the multiplexor logic circuit arrangement thereby allowing data to pass through said arrangement onto the communications highway.

In one feature of the invention two multiprotocol communications adapter cards are mounted in a PC. This allows the PC to transmit information using two different protocols, simultaneously. To effectuate the simultaneous transmission predetermined pins on each card are interconnected with a jumper cable. As a result, a control signal is fed into the configuration register. The configuration register utilizes the signal to characterize each card as a primary or secondary. Also, the contents of the control register are used to generate signals indicating the interrupt level upon which each card will be communicating with the PC.

In another feature of the invention the communications adapter can be disabled by writing a special byte of data into the configuration register.

The foregoing and other objects, features and advantages of the invention will be apparent from the following more particular description of the preferred embodiment, as illustrated in the accompanying drawings.

DETAILED DESCRIPTION OF THE PREFERRED EMBODIMENT

Figure 1:
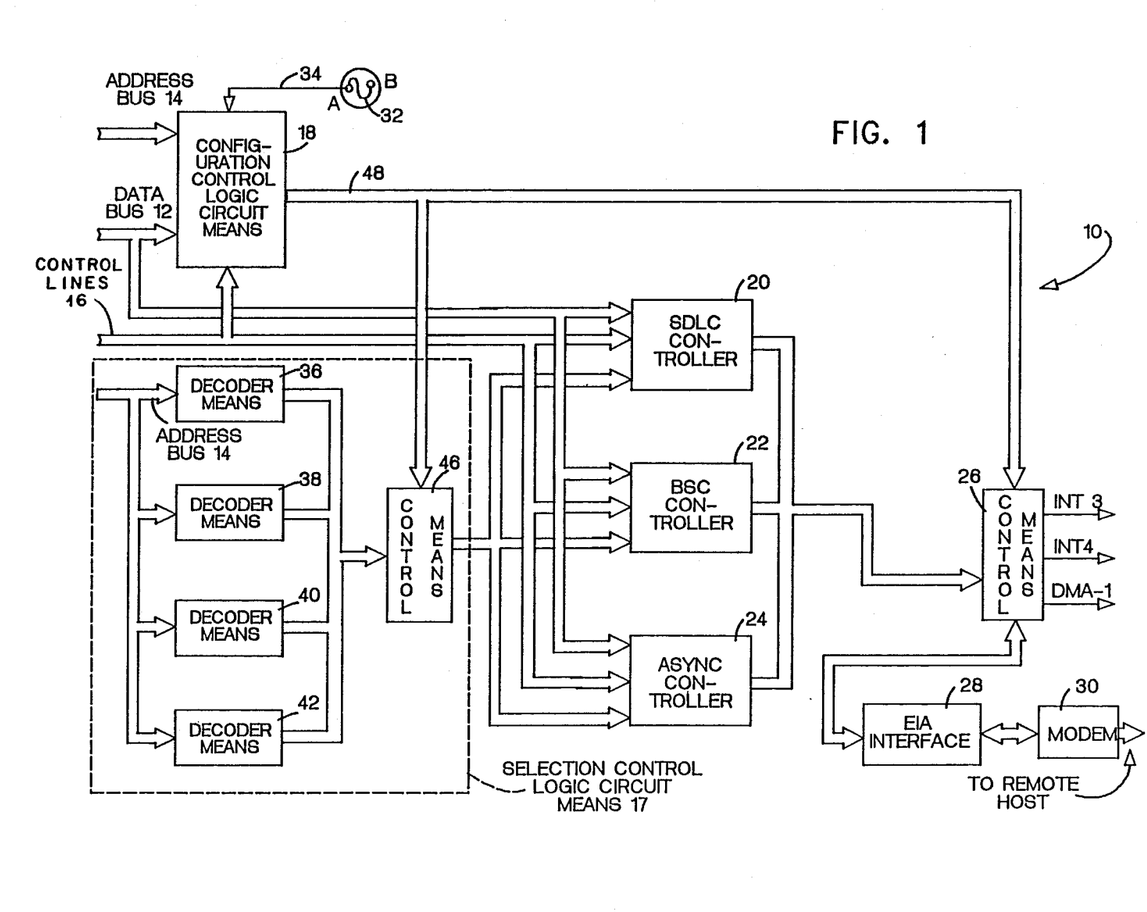
FIG. 1 shows a functional block diagram of the adapter card according to the teachings of the present invention.

FIG. 1 shows a functional block diagram of multi-protocol communication adapter 10 according to the teaching of the present invention. A Local Area Network such as a store system includes a store controller which is connected to the store loop and carries out the control function of the system. The store controller may include a personal computer (PC) such as the IBM PC/AT. Of course, any other type of controller may be used without departing from the scope and spirit of the present invention. The adapter circuit 10 is designed to interface with the processor (not shown) such that it can be used for direct communications with a remote host computing system (not shown).

The multi-protocol communications adapter 10 is coupled to the loop controller or processor (not shown) via address bus 14, data bus 12, and control lines 16. Data bus 12 is used for transferring control information to the multi-protocol communications adapter card. It is also used to transfer bidirectional data. Likewise, the address bus transfers addressed information from the processor to the card while the control lines transfer enabling (that is, controlled) information from the processor to the card. The buses (12, 14) and control lines 16 are intercepted by configuration logic control circuit means 18. As will be described subsequently, the function of the configuration logic control circuit means 18 is to accept controlled information from the processor (not shown) and to configure the multi-protocol communications adapter so that only one of the protocol controllers identified by numerals 20, 22 and 24 is made to convert a signal stream supplied on bus 12 and control lines 16 to a selected protocol.

Although controllers 20, 22 and 24 may be used to convert a signal stream into any type of protocol or format in the preferred embodiment of this invention, controller 20 will convert a signal stream into an SDLC protocol. Similarly, controller 22 will convert a signal stream into a bisync format and controller 24 will convert a signal stream into an async format. The SDLC, bisync and async protocols are well known in the prior art and therefore the details of the controllers 20, 22 and 24 will not be given. Suffice it to say that a selected circuit arrangement for converting signals into an SDLC format is the model 8273 SDLC module manufactured by the Intel Corporation. A suitable circuit arrangement for generating the bisync signals is the model 8251 bisync module manufactured by Intel Corporation. Finally, a suitable circuit arrangement for generating the async signals is the model 16450 async module manufactured by National Semiconductor Corporation. In addition to processing a signal stream into a selected protocol, the protocol converters will also deserialize the data before transmission through control means 26, EIA interface 28 and modem 30 to the remote host (not shown). As with the protocol converters, both the EIA interface 28 and modem 30 are well known communications devices and as such details will not be given. For example, the functions of EIA interface 28 can be provided from an RS232 module.

Still referring to FIG. 1, the processor (not shown) addresses the configuration register (to be described subsequently) of the configuration logic control circuit means 18 at one of two addresses. In the preferred embodiment of this invention the configuration register can be addressed at port address 3AF or 38F. It should be noted that these addresses are consistent with the IBM PC address scheme. If another PC or processor with a different addressing scheme is used, then the address for the configuration register may be different.

Because the configuration register (to be described subsequently) can be addressed at one of two addresses, a jumper identified by numeral 32 is used to tie two pins identified by A and B. By placing a jumper on the multi-protocol communications adapter card 10, a signal is generated and is supplied over conductor 34 to the configuration logic control circuit means 18. As will be explained subsequently, the configuration control logic circuit means 18 uses the signal to determine whether the card is a primary card or a secondary card. Whether the card is characterized as a primary card or a secondary card depends on the pins which are connected via the jumper on the card.

Figure 5A:
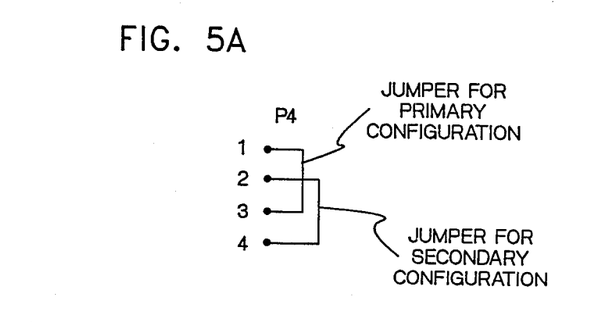
FIG. 5A shows physical arrangements for configuring the MPCA card into different operational modes.

Turning, for a moment, to FIG. 5A, a graphical representation of the pin side of the multi-protocol card is shown. The rows are identified by numeric characters 1-4. Alphanumeric character P4 identifies a single column on the card. In keeping with the preferred embodiment of the present invention, in order for a card to be characterized as a primary card pins 1 and 3 (column P4) must be tied together by a jumper. Correlating the nomenclature of FIG. 5A with the nomenclature of FIG. 1, pins A and B (FIG. 1) are the equivalent of pins 1 and 3 (FIG. 5A). Similarly, in order to characterize a card as a secondary card, pins 2 and 4 (column P4) must be tied together. Because the multi-protocol communication adapter card can be addressed at two different addresses and as a result be characterized as a primary card or a secondary card, a single PC can support two cards. In addition, each of the cards in the PC can be configured to convert data in the same or opposite communication protocol.

Referring again to FIG. 1, a plurality of decoder means identified by numerals 36-42 are connected to address bus 14. The outputs from decoder means 36-42 are fed over bus 44 to control means 46. Under the control of an enabling signal on conductor 48, control means 46 will select the output from one of the decoder means. The output will then be supplied to one of the protocol controllers 20-24. As will be explained subsequently, each of the protocol controllers can be addressed within a predetermined address range. Whenever the assigned address range is decoded by one of the decoder means, the output of that decoder means is fed through control means 46 to the selected controller. In the preferred embodiment of this invention, decoder means 38 decodes the address range 380-38F. Decoder means 36 decodes address range 3A0-3AF. Decoder means 42 decodes address range 2F8-2FF. Decoder means 40 decodes address range 3F8-3FF. Under the control of control signals on conductor 48 control means 26 will select one of the outputs from controllers 20, 22 or 24. The selected output is fed through bus 48 to the EIA interface 28 to modem 30 and onto the communications highway to a remote host computer system (not shown).

In addition to selecting the output of one of the protocol controllers, control means 26 generates output interrupt signals on the lines labeled interrupt (INT)3 and interrupt (INT)4. Also, a direct memory access signal will be generated on the line labeled DMA-1. The interrupt signals and the DMA signals are fed back to the microprocessor. As stated previously, the interrupt signals indicate the interrupt level on which the card will be communicating with the microprocessor. Likewise, the DMA-1 line can be raised when the card needs to communicate with a DMA controller (not shown).

Figures 2, 2A:
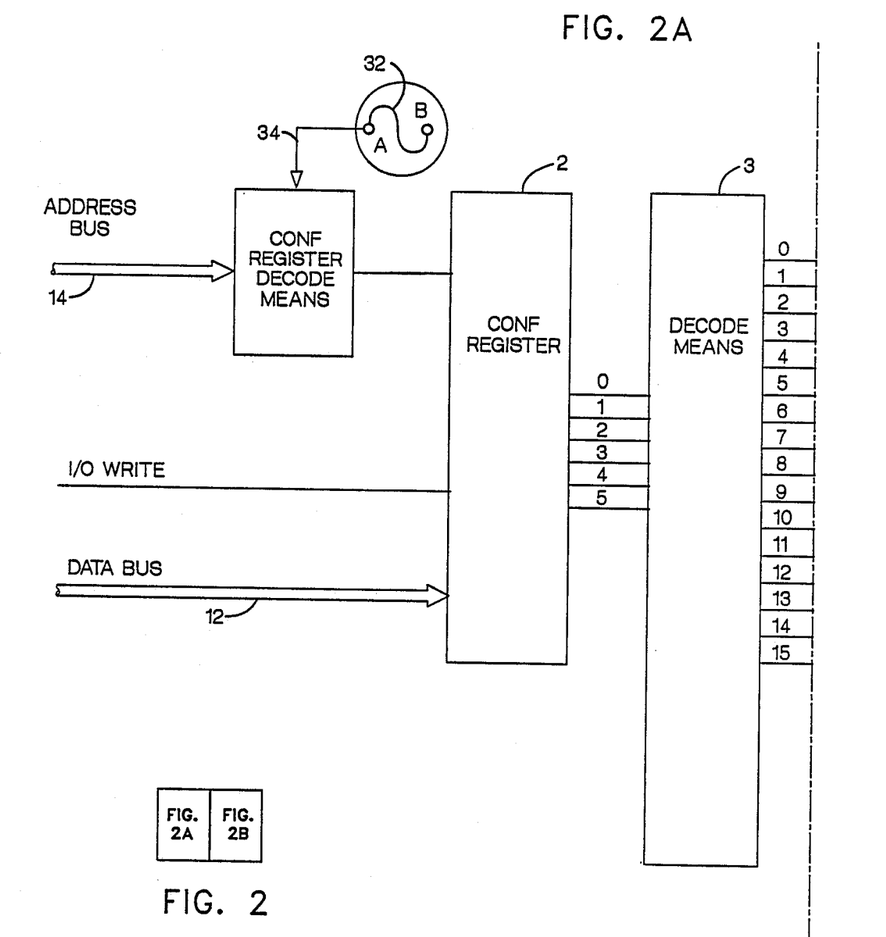
FIG. 2 shows a block diagram of a circuit arrangement for the configuration control logic circuit means.
Figure 2B:
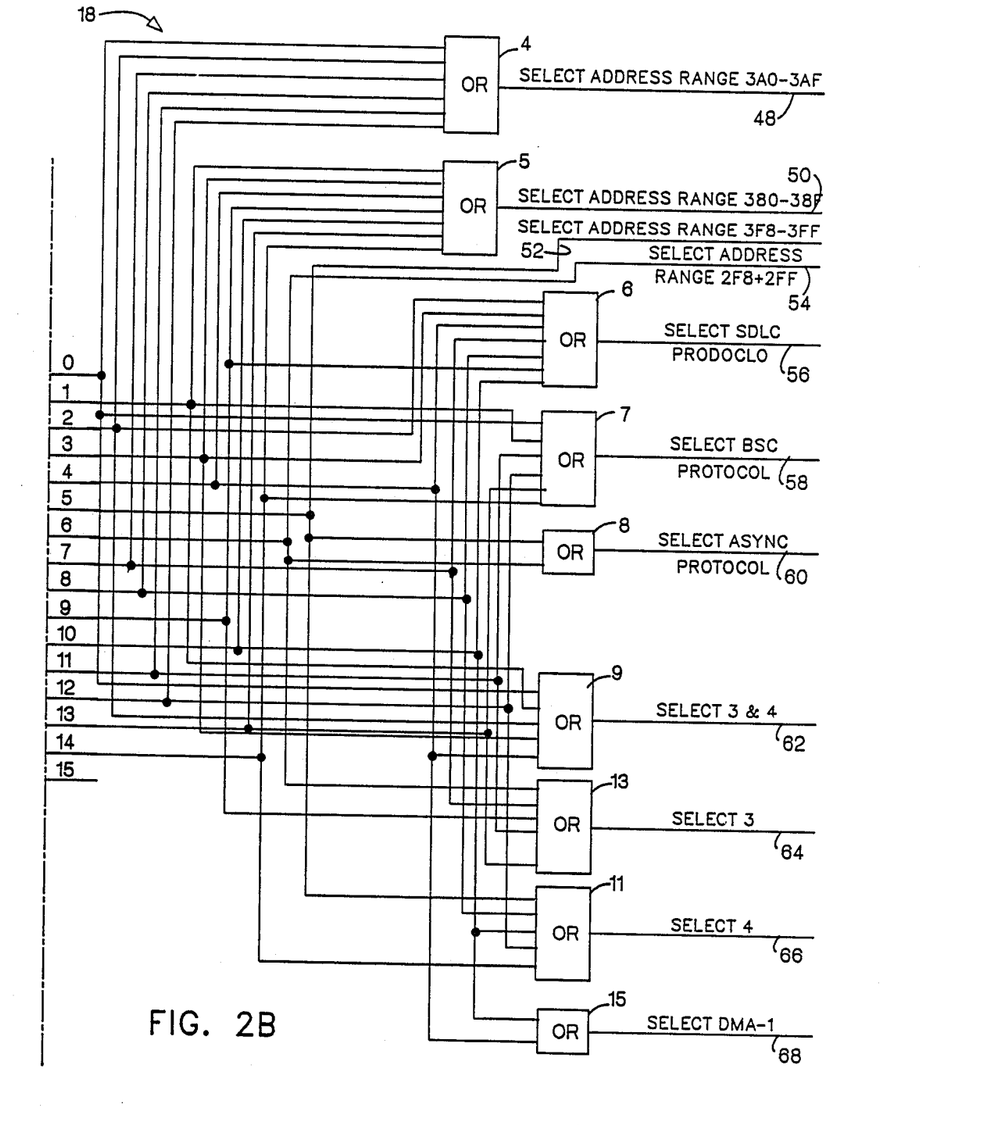

FIG. 2 shows a block diagram for the configuration control logic circuit means 18. In order to simplify the description of the present invention, elements that are common to previously described elements will be identified with common numerals. The configuration control logic circuit means 18 includes a configuration (CONF) register decode means 1. The configuration register decode means 1 is a conventional decoder which monitors address bus 14 and when the address for configuration register 2 is observed on the bus a signal is generated and outputted on the line labeled SELECT. Simultaneously therewith, if the personal computer (PC) places a write signal on the line labeled I/0 WRITE, the data on data bus 12 is latched into configuration register 2. As stated before, the configuration register decode means will decode one of two addresses. The decoded address will depend on the pins that are interconnected by jumper 32.

The configuration register will output a plurality of signals on pins 0–5. With the signals on pins 4 and 5 being a logical 0, the decode means 3 performs a 4–16 decode on bits 0–4 and outputs a plurality of signals on pins 0–15. The signals on pins 0–14 are used by OR circuit blocks 4, 5, 6, 7, 8, 9, 13, 11 and 15 to generate select signals on conductors 48–68. Each conductor is captioned with an appropriate name indicating the function which the particular conductor performs. For example, the signals on conductors 48–54 are used to select pre-assigned address ranges. In particular, the signal on conductor 48 selects address range 3A0–3AF, etc. Likewise, the signals on conductors 56–60 are used to select the protocol controller. The, signals on conductors 62–66 are used to select the interrupt levels on which the adapter card will communicate with the processor (not shown). The signal on conductor 68 provides a direct memory access capability to the card.

The present invention provides a capability whereby the adapter card can be disabled from the PC interface. This is achieved by writing a special data byte (0F) into the configuration register. If this byte is written into the configuration register, pin 15 of decode means 3 is activated and the adapter will be electrically removed from the PC bus. In this state, the adapter will not answer to any address. Similarly, the configuration register will not activate any of the interrupts.

Figures 3, 3A, 3B:
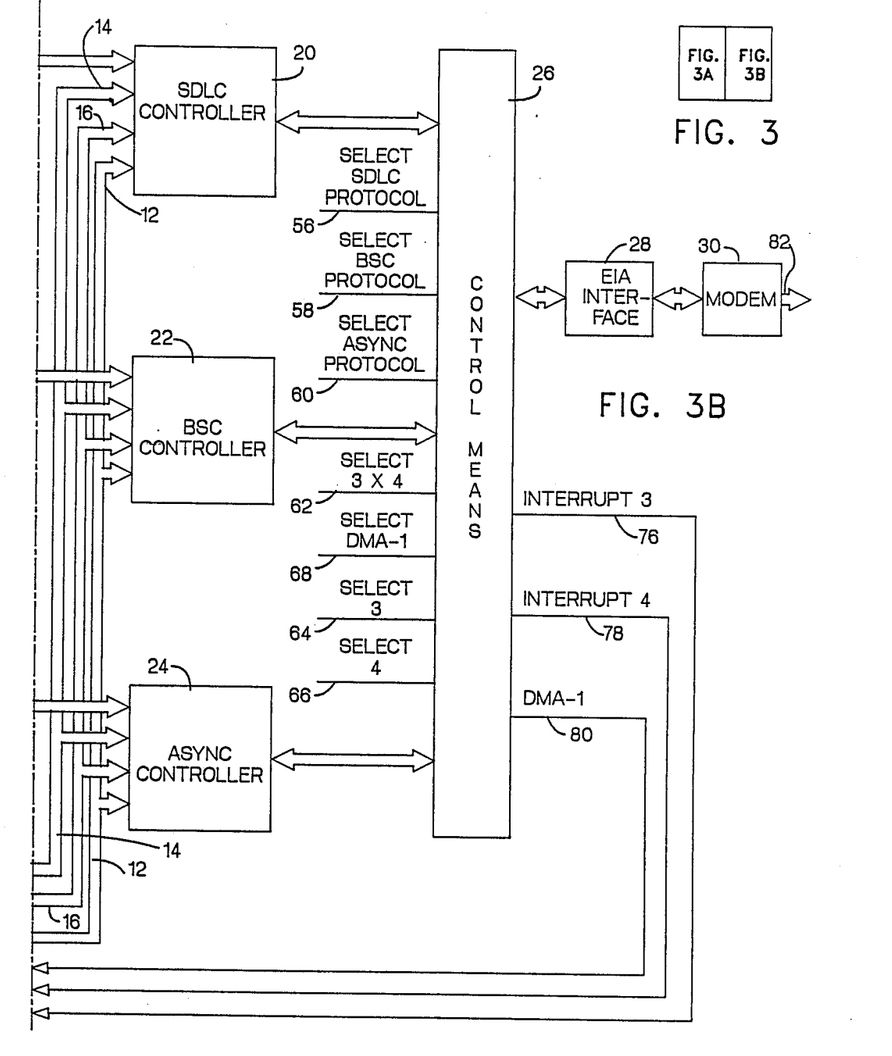
FIG. 3 shows a block diagram for the protocol controllers and the circuitries which are used to select a particular controller.
Figure 3A:
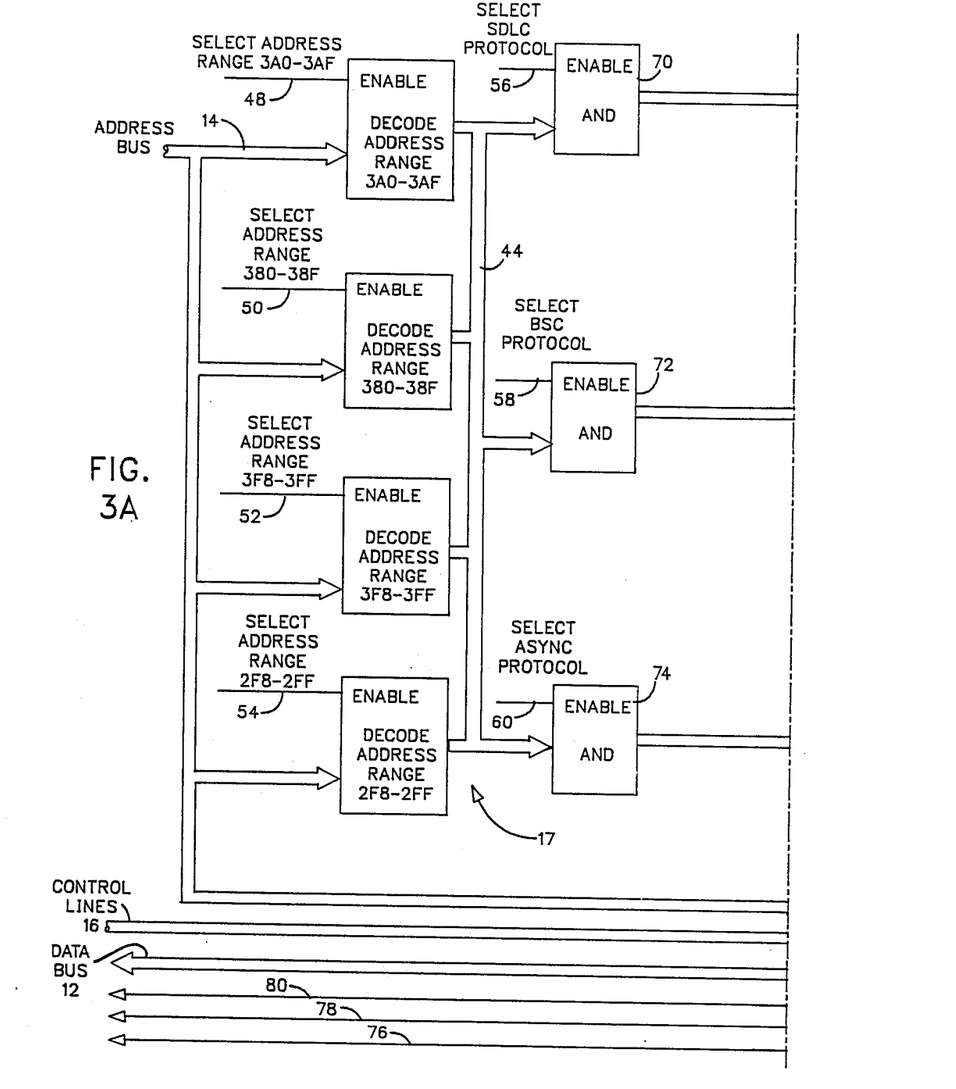

FIG. 3 shows a block diagram of the logic which selects one of the protocol converters. As before, common elements are identified with similar numerals. The selection control logic circuit means 17 includes a plurality of decoders identified by numerals 36–42. The output from the decoders is tied to bus 44 while their inputs are tied to address bus 14. Each decoder is a conventional decode module and is controlled to decode a particular address range. Each of the protocol controllers 20–24 is assigned to one or more address ranges and by placing the address range on the address bus the PC (not shown) can address a selected protocol controller.

Each of the decoders 36–42 is enabled by appropriate control signals on conductors 48–54. The enabling signals on conductors 48–54 are developed from FIG. 2. Thus, if one wishes to activate the output from decoder 38, the control signal on conductor 50 is activated and the address 380–38F is placed on address bus 14 by the PC. The other decoders can be activated in a similar manner. The signals on bus 44 are gated through one of the AND gates 70–74. In order to activate one of the AND gates, an appropriate enabling signal must be placed on one of the conductors 56–60. As before, these signals are generated from FIG. 2.

The outputs from AND gates 70–74 are fed over respective buses into one of the protocol converters. More particularly, the output from AND gate 70 is fed into SDLC controller 20. The output from AND gate 72 is fed into bisync controller 22. The output from AND gate 74 is fed into async controller 24. In addition, control lines 16 (from the PC) are fed into the controllers. Also, bidirectional data bus 12 is fed into the protocol converters. The output from the protocol converters 20, 22 and 24 is fed over appropriate buses into control means 26. The control means includes a plurality of combinatorial logic which are enabled by select signals on conductors 56–68. The select signals are developed and shown in FIG. 2. For example, if one wishes the output signals from SDLC controller 20 to be gated into EIA interface 28, one or more AND gates are gated with the select SDLC protocol signal on conductor 56. The signals from EIA interface 28 are then processed through modem 30 and onto the communications highway 82 from whence they are transferred to the remote host computer (not shown). The processing of data to the bisync or the async controller is handled in a similar fashion.

Still referring to FIG. 3, the select signals on conductors 62–68 are utilized by combinatorial logic in control means 26 to generate interrupt signals on conductors 76 and 78 and DMA-1 signal on conductor 80. Signals on conductors 76–80 are fed back to the personal computer (not shown).

Figure 4:
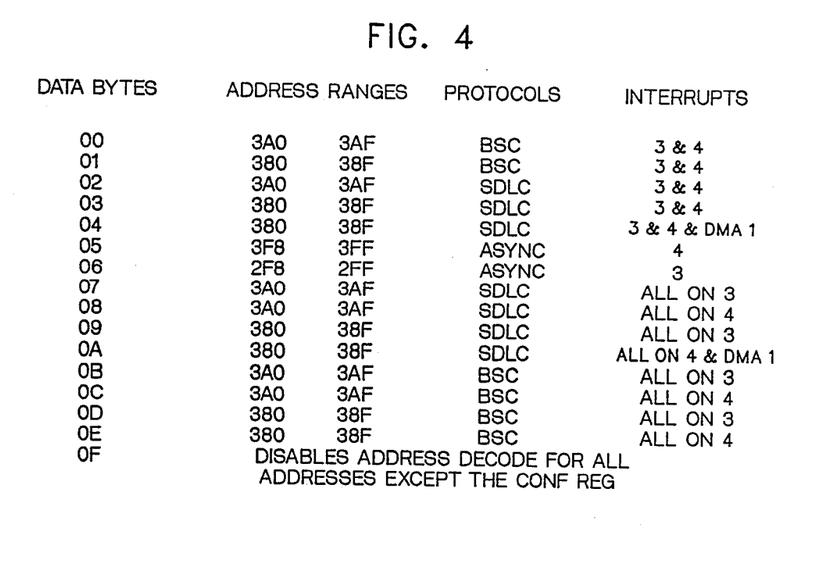
FIG. 4 shows a table of values for setting up the configuration register for the primary card.

FIG. 4 is a table showing the addressing scheme for the configuration register. The first column in the table is captioned "Data Bytes" and represents the hexadecimal notations which are written by the personal computer into the configuration register. The second column in the table is captioned "Address Ranges" and represents the address ranges which are enabled when a corresponding data byte is written into the configuration register. The third column in the table captioned "Protocols" represents the protocol which is selected when the corresponding data byte is written into the configuration register. Finally, the fourth column in the table captioned "Interrupts" represents the various interrupt levels on which the adapter card will communicate with the processor when a particular data byte is written into the configuration register. If the processor writes hexadecimal character 00 into the configuration register, address range 3A0–3AF is selected and the card will communicate using the bisync protocol. The card will then communicate on interrupt levels 3 and 4 with the processor. Another example will be given to explain the operation of the card. Suppose one wishes to communicate using the async protocol. One can write either data byte 05 or 06 into the configuration register. The card will then communicate with the processor on either interrupt level 4 or 3. It is believed that the above examples are sufficient to explain the operation of the card and a further description about the card will not be given.

As described above, one can disable the card from the processor interface. In order to do this, the code 0F would be written into the configuration register. It should be noted that the codes selected in FIG. 4 are merely for explanatory purposes and do not limit the invention in any way.

Figure 5B:
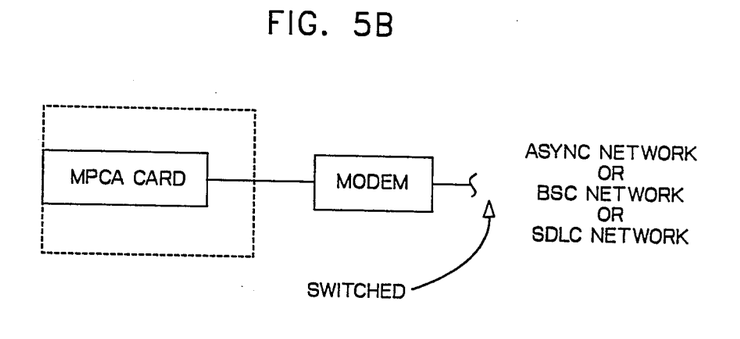
FIG. 5B shows a configuration for a single MPCA card and a switched network.

It is obvious from the above description that the MPCA card can be dynamically configured at any time by merely changing the contents of the configuration register. This being the case, only one adapter card and a switched modem are needed to operate with an async, bisync or SDLC network. A graphical representation of this feature is shown in FIG. 5B where the MPCA card is mounted in the personal computer and a switched network including a modem interconnects the output of the card to the various networks.

Figure 5C:
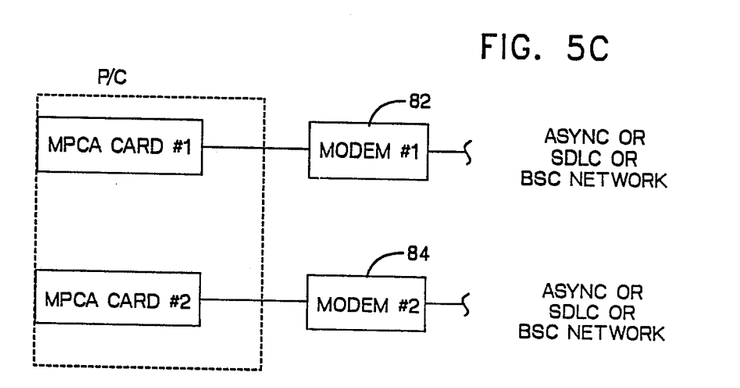
FIG. 5C shows a configuration wherein two MPCA cards are made to communicate simultaneously.

As is described above, the card can also be configured to put all interrupts on one level. This feature allows a user to operate two communication lines 82 and 84 (FIG. 5C) simultaneously. In such a configuration one card would operate with all interrupts on level 3 and the other card would operate with all interrupts on level 4. A graphical representation of this feature is shown in FIG. 5C where MPCA number 1 and MPCA number 2 are mounted in a single PC. MPCA 1 communicates through modem 1 to a remote host computer using one of these selected protocols. Similarly, MPCA 2 communicates through modem 2 to a remote host (not shown) using one of the selected protocols.

Operation

The MPCA card can be configured from a keyboard or a user program. Either technique is well within the skill of the art and the details of a particular technique will not be given. The personal computer (from the keyboard or user program) writes addresses and the control information on the interface. Configuration register decode means 1 constantly monitors the address bus 14 (FIG. 2) for a decode of 03AF or 038F. Whether the card is addressed at 03AF or 038F depends on the position of jumper 32. Upon decoding its appropriate address, the configuration register decode means generates a select signal and transmits it to the configuration register 2. If the bus cycle is an I/O write cycle, the data on the PC bus 12 will be latched in the configuration register. If bits 4 and 5 are both set to 0, decode means 3 performs a 4-16 decode on bits 0, 1, 2 and 3. The mutually exclusive outputs from decoder means 3 are further decoded by the OR circuits 4, 5, 6, 7, 8, 9, 10, 11 and 12. An address range will be selected and outputted on conductors 48-54. Protocol selections will be generated and outputted on conductors 56-60. Finally, interrupt levels information are generated and outputted on conductors 62-68. The above described scheme allows the adapter card to be changed dynamically under program control to match existing PC programs and different system configurations.

While the invention has been particularly shown and described with reference to a preferred embodiment thereof, it will be understood by those skilled in the art that various changes in form and details may be made therein without departing from the spirit and scope of the invention.

Having thus described our invention, what we claim as new and desire to secure as Letters Patent is as follows:

1. A multi-protocol communications adapter circuit for use in a telephone communication system or network for interfacing a processor with a modem for providing communication between said processor and a remote host computer via said communication system or network, comprising;

a common communications channel which includes a programmable configuration register for storing control information generated by the processor, said control information representative of one of a plurality of protocols to be used to format data to be transmitted to the remote host computer by means of said communication system or network;

a configuration control logic circuit means coupled to said register; said configuration control logic circuit means operable to monitor the contents of the register and for generating a plurality of control signals therefrom;

address decoding means coupled to an address bus of said processor; said address decoding means being operable for generating and outputting enable signals if activated by the control signals and if a predetermined address range is being decoded on the address bus; and a plurality of protocol conversion controllers coupled to the address decoding means, each one being responsive to the enabling signals and operable for receiving or transmitting a data stream and for converting said data stream into a predetermined protocol format for transmission through said communications system or network.

2. The multi-protocol communications adapter circuit of claim 1 further including a logic circuit control means coupled to the outputs of the protocol conversion controllers; said logic circuit control means being operable when activated for permitting data from one of said protocol conversion controllers to pass through and for generating at least one interrupt control signal and a direct memory access (DMA) control signal.

3. The multi-protocol communication adapter of claim 1 wherein the configuration control logic circuit means further includes a configuration address register decoder means having its inputs coupled to an address bus of the processor and its output coupled to the configuration register;

a decoder means coupled to the configuration register and operable for generating a plurality of outputs; and a plurality of "OR" circuits each one being coupled to selected ones of the plurality of outputs.

4. The multi-protocol communications adapter circuit of claim 1 wherein the address decoding means includes a plurality of individual address decoders, each one being operable for decoding a pre-assigned address range; and a plurality of logical "AND" circuits each one being connected to one of the individual address decoders and operable when activated for passing signals from one of the decoders.

5. The multi-protocol communications adapter circuit of claim 1 wherein the plurality of protocol conversion controllers include an SDLC controller, a bisynchronous controller and an asynchronous controller.

* * * * *